(12) United States Patent
Wright et al.

(10) Patent No.: US 11,558,367 B2
(45) Date of Patent: Jan. 17, 2023

(54) NETWORK BASED PASSWORD POLICY DETECTION AND ENFORCEMENT

(71) Applicant: INTERNATIONAL BUSINESS MACHINES CORPORATION, Armonk, NY (US)

(72) Inventors: Holly Wright, Studio Village (AU); Dale Bowie, Benowa (AU); Peter Terence Cogill, Bundall (AU); Hannah Claire Jury, Sydney (AU)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 16/829,783

(22) Filed: Mar. 25, 2020

(65) Prior Publication Data
US 2021/0306315 A1    Sep. 30, 2021

(51) Int. Cl.
*H04L 29/06* (2006.01)
*H04L 9/40* (2022.01)
*G06F 21/46* (2013.01)

(52) U.S. Cl.
CPC ........... *H04L 63/083* (2013.01); *G06F 21/46* (2013.01); *H04L 63/20* (2013.01)

(58) Field of Classification Search
CPC ... H04L 63/083; H04L 63/20; H04L 63/0245; G06F 21/46; G06F 21/45
See application file for complete search history.

(56) References Cited

U.S. PATENT DOCUMENTS

| 5,719,941 | A  | * | 2/1998  | Swift ................... G06F 21/31 |
|           |    |   |         | 705/72 |
| 7,849,320 | B2 |   | 12/2010 | Raikar et al. |
| 7,877,506 | B2 | * | 1/2011  | Curtis ................. H04L 63/0471 |
|           |    |   |         | 709/238 |
| 8,230,455 | B2 |   | 7/2012  | Hazlewood et al. |
| 8,347,347 | B2 |   | 1/2013  | Feng et al. |
| 2003/0074552 | A1 | * | 4/2003 | Olkin ................... H04L 63/062 |
|           |    |   |         | 713/150 |

(Continued)

FOREIGN PATENT DOCUMENTS

| CN | 103701805 A | 4/2014 |
| CN | 109948331 A | 6/2019 |
| JP | 5485246 B2 * | 5/2014 ............ G06F 21/41 |

OTHER PUBLICATIONS

Anonymous, "Password Compliance Manager/Advisor", IP.com Prior Art Database Technical Disclosure, IP.com No. IPCOM000252170D, IP.com Electronic Publication Date: Dec. 20, 2017, 4 pages.

(Continued)

*Primary Examiner* — John B King
(74) *Attorney, Agent, or Firm* — Heather Johnston

(57) ABSTRACT

A processor may receive a packet configured to travel in a network. The packet may be configured to travel from a first device to a second device. The processor may analyze the packet. The processor may detect a password with the packet. The processor may determine whether the detected password complies with at least one password policy. The processor may provide a password policy compliance output to a user. The password policy compliance output may indicate to the user whether the detected password complies with the at least one password policy.

17 Claims, 5 Drawing Sheets

(56) References Cited

U.S. PATENT DOCUMENTS

| | | | |
|---|---|---|---|
| 2003/0202514 A1* | 10/2003 | Cromer | H04L 45/20 370/392 |
| 2003/0204746 A1* | 10/2003 | Cromer | G06F 21/575 713/310 |
| 2006/0136993 A1* | 6/2006 | Smith | G06F 21/31 726/3 |
| 2007/0150743 A1* | 6/2007 | Weatherford | G06F 21/606 713/184 |
| 2011/0239267 A1 | 9/2011 | Lyne et al. | |
| 2013/0326601 A1* | 12/2013 | Nishikawa | H04L 9/0866 726/6 |
| 2015/0254452 A1* | 9/2015 | Kohlenberg | G06F 21/45 726/6 |
| 2015/0324593 A1* | 11/2015 | Abuelsaad | H04L 63/0428 726/26 |
| 2015/0347325 A1* | 12/2015 | Hutchison | G06F 13/10 710/19 |

OTHER PUBLICATIONS

Asadoorian, "Scanning For Default & Common Credentials Using Nessus", Tenable, Nov. 23, 2010, 6 pages, https://www.tenable.com/blog/scanning-for-default-common-credentials-using-nessus.

Beaver, "Create and enforce a password policy across the enterprise", Search Enterprise Desktop, Nov. 16, 2018, 6 pages, https://searchenterprisedesktop.techtarget.com/tip/Create-and-enforce-a-password-policy-across-the-enterprise.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

NETWORK BASED PASSWORD POLICY DETECTION AND ENFORCEMENT

BACKGROUND

The present disclosure relates generally to the field of password policy enforcement, and more specifically to enforcing a password policy using network-based password policy enforcement.

Computing devices utilize passwords to identify and distinguish users and their access or capabilities on a computing device, across a computing network, or applications internal or externally to the computing network. Passwords can help restrict and prevent users from accessing confidential data or accessing programs that they should not be using.

SUMMARY

Embodiments of the present disclosure include a method, computer program product, and system for network-based password policy enforcement. A processor may receive a packet configured to travel in a network. The packet may be configured to travel from a first device to a second device. The processor may analyze the packet. The processor may detect a password within the packet. The processor may determine whether the detected password complies with at least one password policy. The processor may provide a password policy compliance output to a user. The password compliance output may indicate to the user whether the detected password complies with the at least one password policy.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
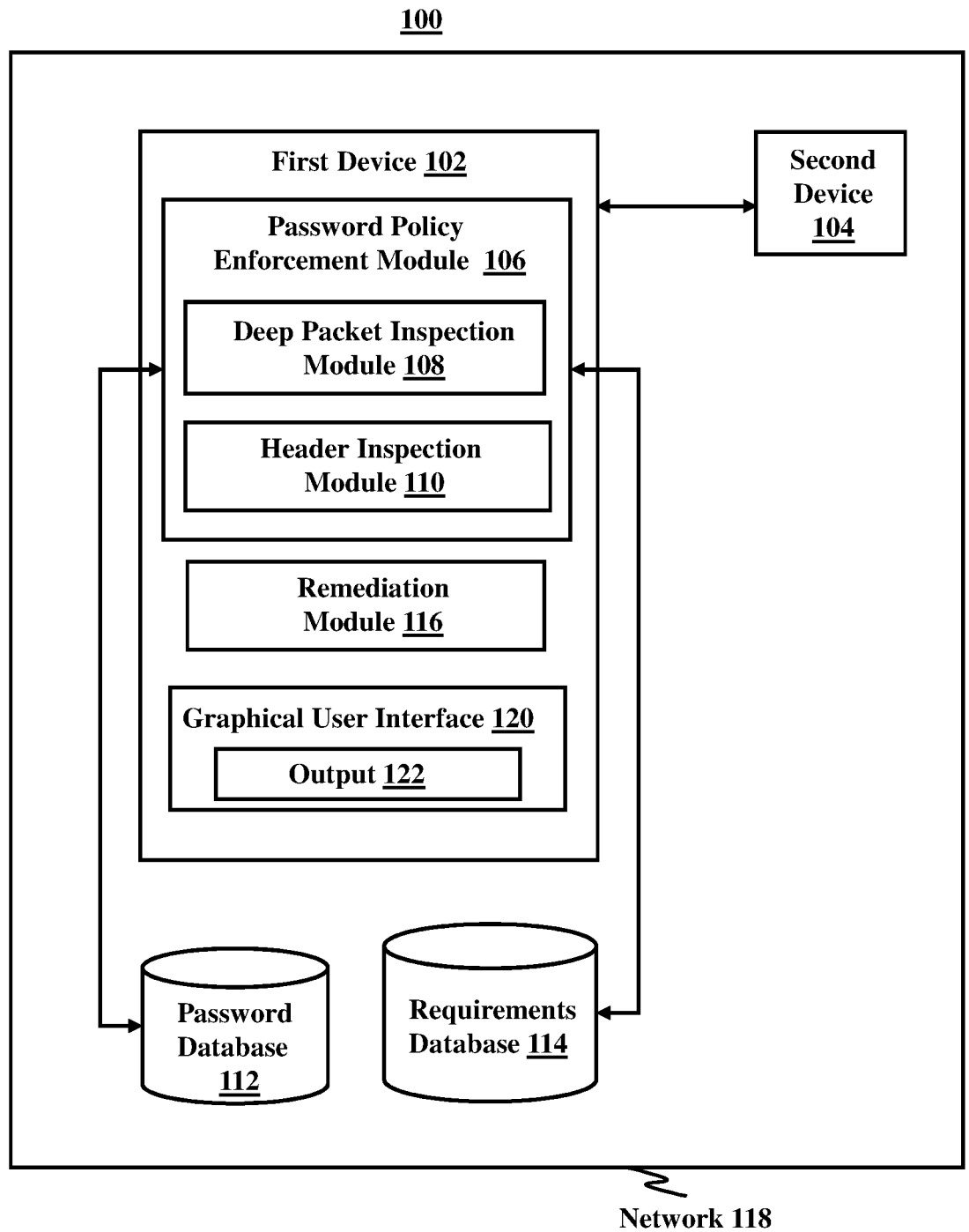
FIG. 1 is a block diagram of an exemplary system for network-based password policy enforcement, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of password policy enforcement, and more specifically to enforcing a password policy using network-based password policy enforcement. While the present disclosure is not necessarily limited to such applications, various aspects of the disclosure may be appreciated through a discussion of various examples using this context.

Generally, in an attempt to mitigate security exploits via password-based logins, an entity will implement a number of password policies, including restrictions on length, age, re-use, special characters, etc. of a password. Other measures, such as multi-factor authentication, are also implemented to strengthen the login process. However, these measures are generally only available and configurable in situations where the entity administers an identity provider (e.g., a corporate Lightweight Directory Access Protocol (LDAP)). In such situations, password policies are typically enforced at a known point by the entity. This can include enforcement points within custom-built applications, configurable third-party applications, or at the LDAP/directory server. The primary downfall of these mechanisms is that they only allow the entity (e.g., an administrator, etc.) to enforce a policy on applications that have exposed this capability. In addition, the investment (e.g., computational costs, resources, etc.) required to configure and maintain the policies on each of these applications is high. Further, password re-use across internal and third-party applications cannot be detected or enforced against by current password protective solutions.

Accordingly, there is a continued need for improved password policy enforcement and it may be advantageous to have a means of network monitoring that detects and analyzes passwords managed by an external provider, or individually managed by end devices (e.g., individual routers, computers, smartphones on a network, etc.).

In some embodiments, a processor may receive a packet configured to travel in a network from a first device to a second device. In some embodiments, the processor may analyze the packet. The processor may detect a password within the packet. In some embodiments, the processor may determine whether the detected password complies with at least one password policy. In some embodiments, the processor provides a password compliance output to a user where the output indicates to a user whether the detected password complies with the at least one password policy. In some embodiments, the packet may be traveling in the network.

For example, a user on smartphone maybe signing up for a new subscription which requires a password. The smartphone has password policy enforcement firmware. The firmware received a packet, analyzes the packet, and detects that there is a password within the packet. The firmware determines that the password does not comply with at least one password policy, and the firmware triggers the smartphone to send an alert to the user that indicates that the password needs to be changed. In some embodiments the password policy enforcement may be done by software in combination with or instead of firmware.

In some embodiments, the processor may implement a remediation action if the detected password does not comply with a password policy. In some embodiments, the remediation action may be designed to separate insecure devices, servers, clients, or destinations in the network; or remedy the password policy violation. For example, a user may be generating a new password for a website while using a public computer. The public computer may have a password protection software installed that detects that the user is generating the new password and determines that the new password is too weak (e.g., not long enough, easily guessable, etc.). The public computer may remedy the weak password by suggesting that the user enter a passphrase instead.

In some embodiments, the remediation action may include the processor communicating with an enforcement engine (e.g., a firewall, etc.) to block the first device from accessing with the network. In some embodiments, the remediation action may include the processor communicating with the enforcement engine to block insecure resources, or servers, from the network (e.g., to protect a user from distributing a deficient password to insecure sources). In some embodiments, the remediation action may involve the processor alerting a network administrator to the password policy violation (e.g., the user has shared credentials, potentially compromised hosts, etc.). In some embodiments, the remediation action may include the processor communicating with an identity provider to force a change of the detected password in violation of the password policy.

It is noted that a single remediation action may be implemented, or a combination of remediation actions may be implemented. For example, a first user may access an account on a first device, and it may be identified that while the first user is still connected to the account on the first device, the first user is trying to access the account on a second device. It may be identified that the first device is in a location hundreds of miles away from the second device and an enforcement engine may alert an administrator that the first user has likely had its password compromised.

In some embodiments, determining whether the detected password complies with a password policy may include the processor analyzing a feature of the detected password. In some embodiments, the password policy may include one or more requirements for the feature. For example, a feature of the password may be the number and types of characters of the password (e.g., the password is composed of 4 letters, 3 numerals, and 2 special characters). Further, a password policy regarding the feature of the detected password may include a requirement about a minimum number of characters in the password (e.g., a minimum of 8 total characters, etc.), a requirement to use uppercase and lowercase letters (e.g., PassWORD), a requirement to use numerical characters in the password (e.g., Password01), a requirement to use special characters in the passwords (e.g., #, %, etc.), or a requirement to use a combination of two or more types of characters. Following the example, a password policy enforcement system may determine that the four letter, three numeral, and two special character password complies with the password policy.

In some embodiments, determining whether the detected password complies with a password policy may include the processor comparing the detected password to previously observed matching password hashes to determine an age of the password or password re-use. For example, a password policy may require that a password be changed every six months. A user, 18 months in the past, used the password PW2019 which when hashed becomes 20PW19. When prompted to change her password a week ago, the user attempted to use password PW2019 again. The processor recognized the hashed password 20PW19 as duplicative of a previously used password from the hash and a timestamp associated with the hash stored in a password database. Accordingly, the detected password is deemed by the processor to not be compliant with the password policy.

In some embodiments, determining whether the detected password complies with a password policy may include comparing the detected password to a database of previously observed matching password hashes where the age of the previously observed matching password hashes is known. For example, a password policy may require that a password be changed every 90-days. When a user begins to use a new password, the hashed password is stored in a password database with a timestamp. Each time the password is used, the date of first use of the password is retrieved from the timestamp stored in the database in association with the password hash to determine if the password has been used for less than 90 days and whether the detected password complies with a password policy.

In some embodiments, determining whether the detected password complies with a password policy may include the processor comparing the password to a database of compromised password hashes. For example, a user may attempt to setup a password "MyDog'sName123" for a new application which was previously used by the user in an account that was compromised. A password database may store compromised password hashes, including MyDog'sName123. When the user attempts to setup the password MyDog'sName123, the processor may determine that the new password hash matches a compromised password hash and that the detected password does not comply with a password policy. In some embodiments, determining whether the detected password complies with a password policy may include the processor comparing the password to known default passwords (e.g., "admin," "welcome," etc.).

In some embodiments, determining whether the detected password complies with a password policy may include the processor checking the password to determine password re-use on a single destination, across multiple destinations, by multiple network devices or clients to a single destination, or by a new network device added to the network. For example, a user may use the password "myfavpsswd" on five applications internal to his employer's network and may attempt to setup the password "myfavpsswd" in a sixth internal application. The processor may check the password which is being set up with a password database in which five instances of the password's use by this employee has been recorded. The user's employer has a password policy which prohibits re-use of a password on more than five internal applications, and the new (e.g., sixth, subsequent fifth, threshold excessive) use of "myfavpsswd" does not comply with that password policy.

As another example, two employees may share a username and password pair to a particular application. The processor may detect this credential pair being used from two different client devices and determine that the use of these credentials is against a password policy prohibiting credential sharing.

As another example, an employee may attempt to setup a new account on an external legal research tool using a password which a different employee already utilizes on the same external legal research tool. The processor may detect the use of more than one instance of that password's use on the external legal research tool, and determine that the new password does not comply with a password policy prohibiting use of duplicate passwords by different employees on the external legal research tool.

In some embodiments, a password policy may be associated with a strength level of a detected password. In some embodiments, the strength level may be generated based on a comparison of the password to previously observed matching passwords. In some embodiments, the strength level of the detected password may be used to determine whether the detected password complies with a password policy. For example, a password policy may prohibit a user from using the same password on more than one internal application running on a network. A user may have previously setup a password "myfavpsswd" for an internal application running on the network and may attempt to setup a password "my7849@2020pass" for another internal application on the network. A processor communicating with the network may generate a strength level for the detected password "my7849@2020pass" by comparing the detected password with the password "myfavpsswd" stored in a secure, encrypted password database. The strength level for the detected password "my7849@2020pass" may be designated as "high" on a tiered scale of "low," "medium," and "high," because, for example, the detected password differs by a number of characters from the password "myfavpsswd." Following this example, because the strength level of the password is designated as "high," the processor determines that the detected password complies with the password policy prohibiting duplicate password use.

In some embodiments, analyzing the packet includes identifying a header of the packet and a payload of the packet. In some embodiments, a password may be detected using information in the header of the packet. For example, a header may include a network destination that is associated with a password database or that is associated with an address of encrypted information access/storage, which may indicate that the packet is likely to include a password.

Passwords may also be extracted from packets through analysis of the header and payload by specialized protocol and application inspectors. These inspectors have knowledge about the particular encodings and packet structure for each application, and therefore can precisely extract passwords from this payload. For example, a Facebook inspector has knowledge of the Facebook payload structure and knows that the password always follows certain other fields in packets from this application. It can therefore extract the exact password contained in the payload.

In some embodiments, a password may be detected by the processor identifying information in the payload of the packet. In some embodiments, a payload of a packet may include information that exceeds a password threshold indicating that a password has been detected. For example, the information included in the payload may be a repetitive or sequential string of characters (e.g., "123456," "qwerty," "11111," "abc123," etc.), a common password identified from a password database (e.g., "password," "123password," "admin," "football," "welcome," etc.), or specific information associated with a user (e.g., a username, date of birth, employee ID number, etc.).

Referring now to FIG. 1, which illustrates a block diagram of a system 100 for network-based password policy enforcement. System 100 includes a first device 102 and a second device 104 which are configured to be in communication with each other in a network 118. In some embodiments, first device 102 and second device 104 may be any device that contains a processor configured to perform one or more of the functions or steps described herein this disclosure.

In some embodiments, first device 102 includes a password policy enforcement module 106 which is configured to receive a packet (configured to travel) in a network and analyze the packet using a deep packet inspection module 108 and a header inspection module 110. In some embodiments, upon analyzing the packet using the deep packet inspection module 108 and the header inspection module 110, the password policy enforcement module 106 detects a password within the packet, and determines whether the detected password complies with at least one password policy.

In some embodiments, the password policy enforcement module 106 is in communication with a requirements database 114 from which the password policy enforcement module 106 obtains information about at least one password policy. From this information, the password policy enforcement module 106 obtains password requirements of at least one password policy. The detected password is compared to the password requirements of the at least one password policy to determine whether the detected password complies with the password policy. In some embodiments, the password policy enforcement module 106 is in communication with a password database 112 which provides information about common or previously used passwords which can be used by the password policy enforcement module 106 to determine whether the detected password complies with the one or more password policies.

In some embodiments, the password policy enforcement module 106 is configured to provide a password policy compliance output 122 to a user. The password policy compliance output 122 provides an indication to a user regarding whether the detected password complies with the one or more password policies. In some embodiments, the password policy compliance output 122 is displayed to a user using the graphical user interface 120. In some embodiments, the password policy enforcement module 106 communicates with a remediation module 116 which implements a remediation action if the detected password does not comply with the password policy.

In some embodiments, the password policy enforcement module 106 can detect and extract passwords sent over unencrypted channels or channels that can be decrypted at run-time through mechanisms such as key exchange. The password policy enforcement module 106 runs analytics and policy enforcement on passwords, and updates analytics models (for example, by string password hash and time-stamps for future use). The password policy enforcement module 106 communicates with the remediation module 116 to perform remediation steps.

The system 100 for network-based password policy enforcement shown in FIG. 1 is an improvement on solutions for password policy detection and enforcement which rely on the control of a centralized identity provider and the configuration and usage of this on all devices throughout a network. Existing solutions are often impractical as users (e.g., employees, public computer users, etc.) typically interact with an enormous range of third-party applications, which are not managed by a protective entity (e.g., employer, company, etc.). Furthermore, amongst the applications that are owned and managed by the enterprise, there are usually a range of authentication methods employed. Any updates to password policies must be replicated and maintained across each of these entities, which is an expensive and time-consuming process.

An example of this can be seen when considering a company which wants to enforce a consistent password policy throughout the company. Employees in the company are using external, unmanaged applications (such as, for example, DROPBOX), as well as internal applications (such as, for example, applications developed internally that are under the control of the company). The company can only control the access mechanisms for the internal applications, but cannot control what requirements the employee's passwords must meet to log into the external, unmanaged applications. Current mechanisms of password policy enforcement focus on the controls implemented for internal applications, which leaves large security gaps, as these mechanisms cannot be replicated across unmanaged third-party applications.

The system 100 for network-based password policy enforcement shown in FIG. 1 does not require the management of all applications, and allows for a single source of password policy enforcement across all applications that communicate through unencrypted or decryptable channels on the network. This solution, as presented in this disclosure, allows for altering and automation of remediation steps when applications and users are detected using passwords that violate the (e.g., company-wide) password policies.

In some embodiments, to perform the solutions presented in this disclosure, first device 102 and second device 104 may be connected in a network (e.g., network 118) on which a packet-based network monitoring solution is already deployed. Examples of packet-based network monitoring solutions include, for example, QRADAR and QFLOW by IBM.

Further, in some embodiments, the password policy enforcement module 106 can detect passwords in traffic that is observed in un-encrypted form. For example, for web-based applications, this might include the use of an Authentication Header containing a "Basic" authentication per RFC7617, the form post of a "password" field, or other known methods of detecting a password. Password detection can also be achieved within a network by decrypting traffic using a dedicated or integrated decryption offering. When observing un-encrypted network traffic, passwords transmitted in these common forms can be trivially (e.g., easily by known methods/techniques) identified.

Figure 2:
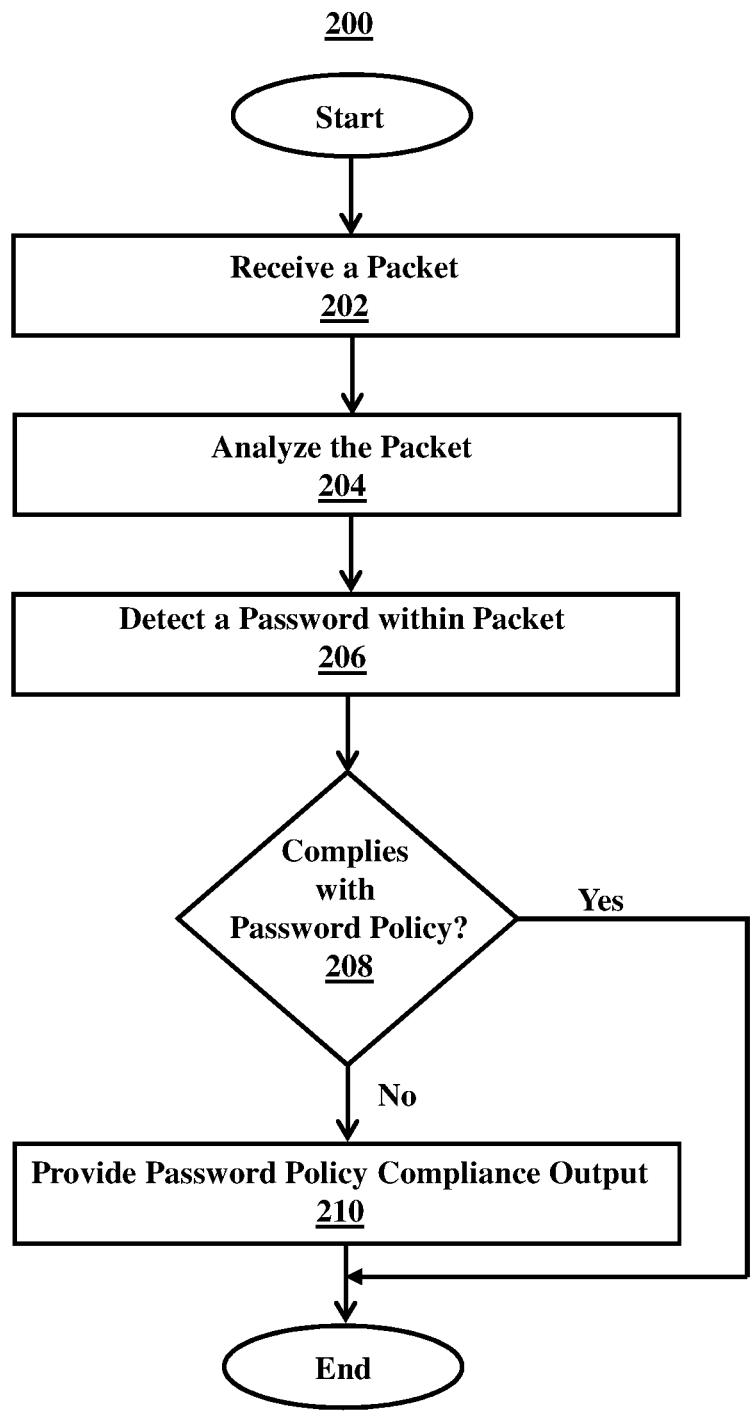
FIG. 2 is a flowchart of an exemplary method for network-based password policy enforcement, in accordance with embodiments of the present disclosure.

Referring now to FIG. 2, illustrated is a flowchart of an exemplary method 200 for network-based password policy enforcement, in accordance with embodiments of the present disclosure. In some embodiments, a processor may perform the operations of the method 200. In some embodiments, method 200 begins at operation 202. At operation 202, a processor receives a packet configured to travel in a network, where the packet is configured to travel from a first device to a second device.

In some embodiments, method 200 proceeds to operation 204, where the processor analyzes the packet. In some embodiments, method 200 proceeds to operation 206 where the processor detects a password within the packet.

In some embodiments, method 200 proceeds to decision block 208. At decision block 208, the processor determines whether the detected password complies with at least one password policy. In some embodiments, if it is determined that the detected password does not comply with at least one password policy, method 200 proceeds to operation 210. At operation 210, the processor provides a password policy compliance output to a user. In some embodiments, after operation 210, method 200 may end. In some embodiments, if it is determined that the detected password does comply with at least one password policy 208, method 200 may end.

As discussed in more detail herein, it is contemplated that some or all of the operations of the method 200 may be performed in alternative orders or may not be performed at all; furthermore, multiple operations may occur at the same time or as an internal part of a larger process. For example, in some embodiments operation 210 may not be performed at all.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
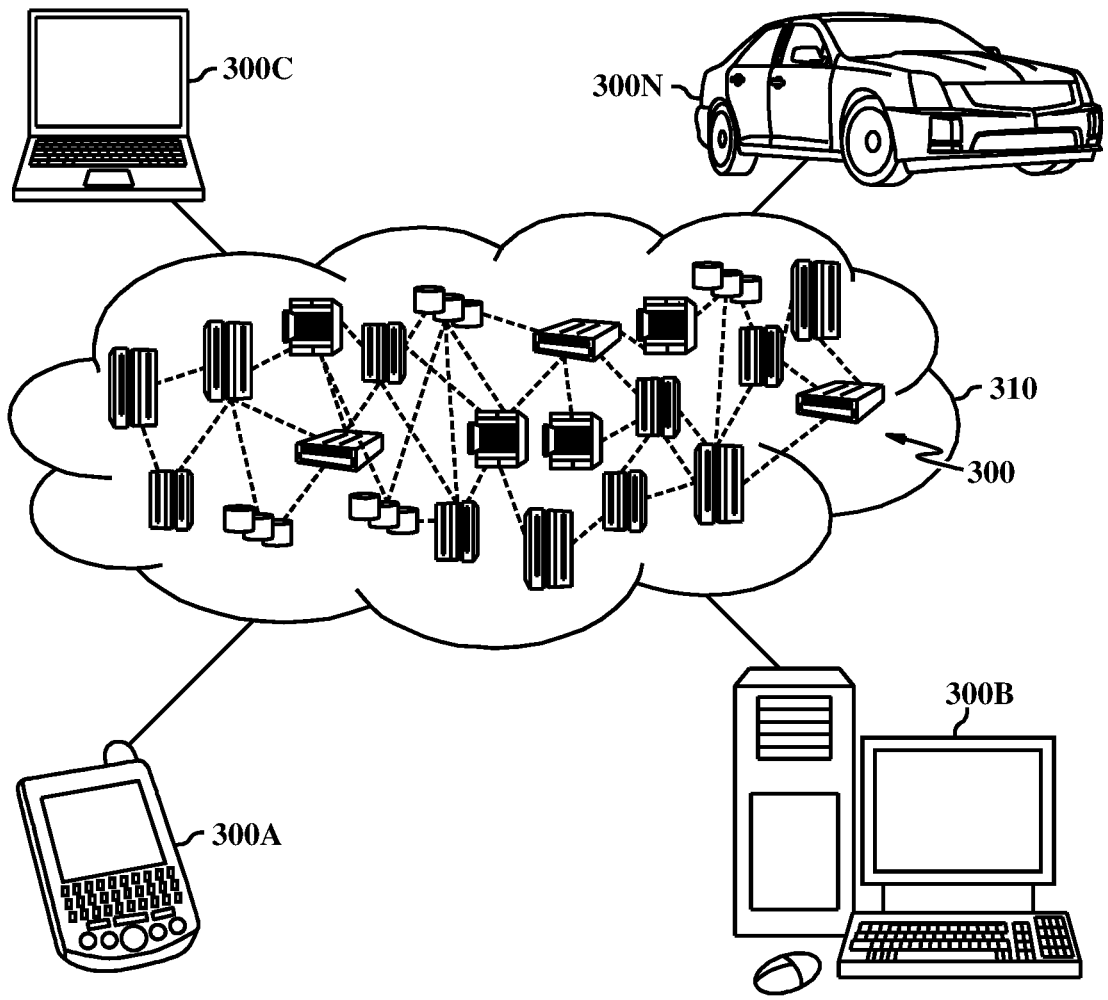
FIG. 3A illustrates a cloud computing environment, in accordance with embodiments of the present disclosure.

FIG. 3A, illustrated is a cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof.

This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing environment 310 can communicate with any type of computerized device over any type of network and/or network addressable connection (e.g., using a web browser).

Figure 3B:
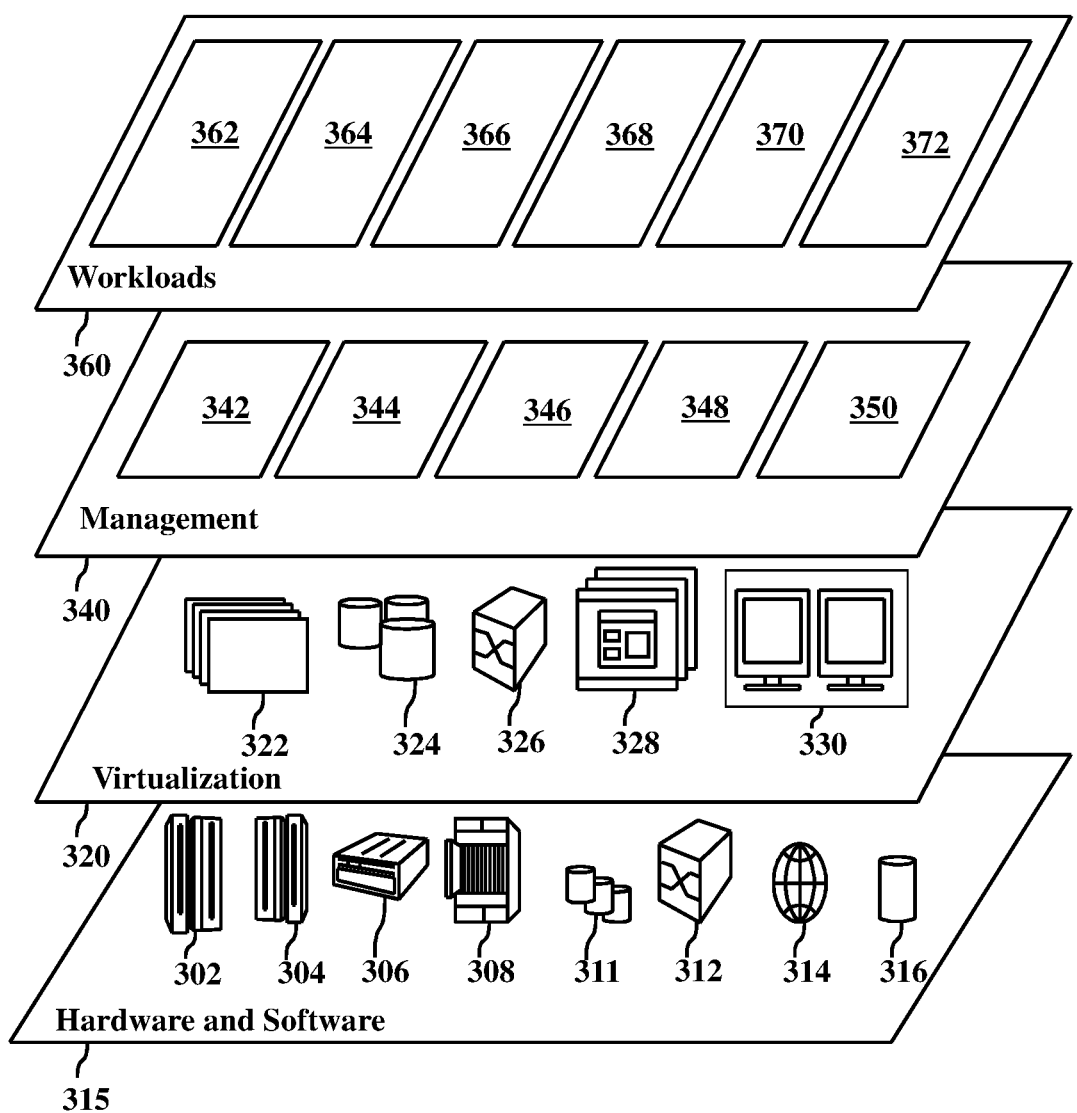
FIG. 3B illustrates abstraction model layers, in accordance with embodiments of the present disclosure.

FIG. 3B, illustrated is a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and network-based password policy enforcement 372.

Figure 4:
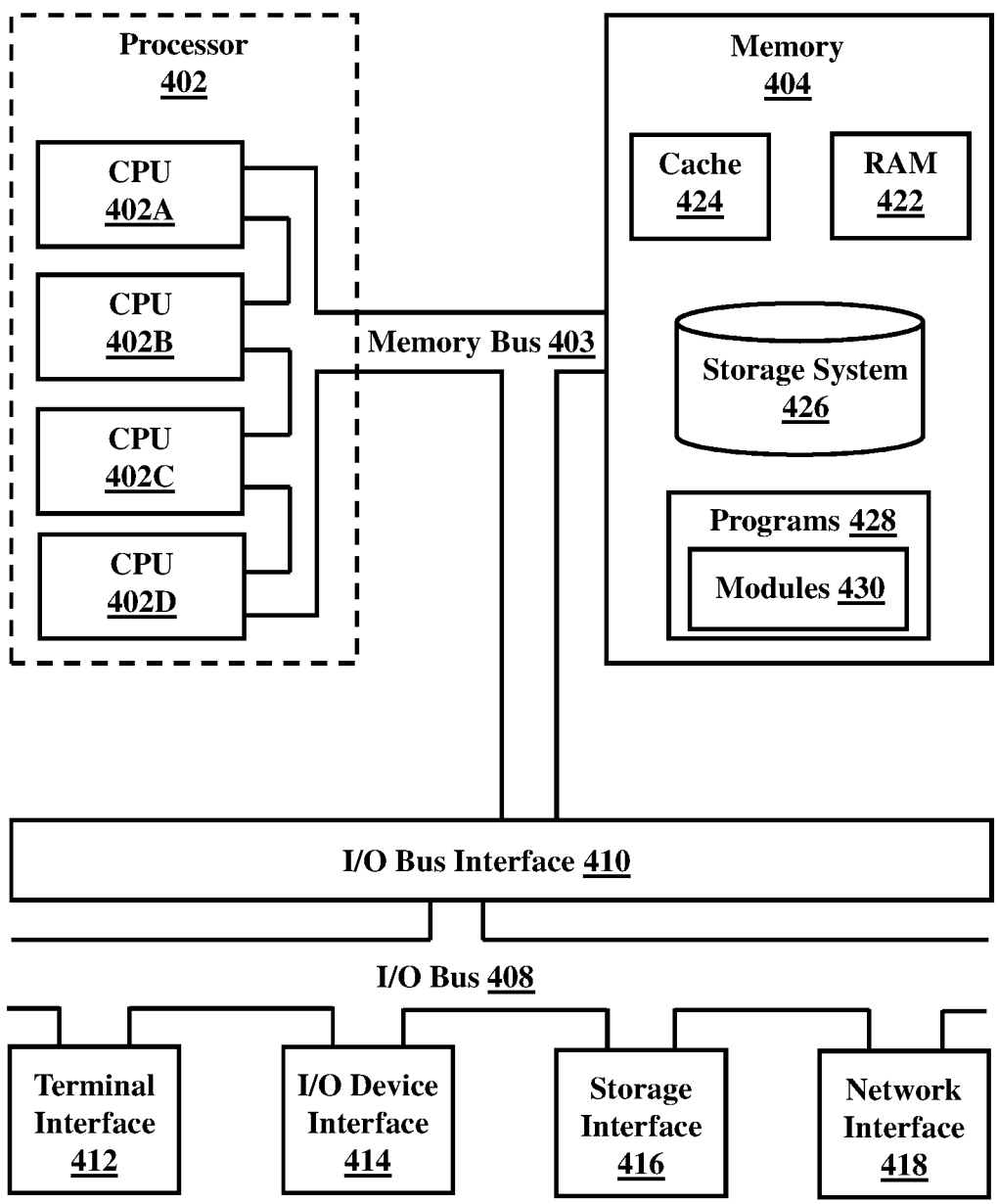
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of network-based password policy enforcement, the method comprising:
   receiving, by a processor, a packet configured to travel in a network, wherein the packet is configured to travel from a first device to a second device;
   analyzing the packet, wherein analyzing the packet includes identifying a header of the packet and a payload of the packet;
   detecting a password within the packet based on analyzing the header of the packet, wherein the detected password is detected based on the header including a network destination that is associated with a password database;
   determining whether the detected password complies with at least one password policy; and
   providing a password policy compliance output to a user, wherein the password policy compliance output indicates to the user whether the detected password complies with the at least one password policy.

2. The method of claim 1, further comprising:
   implementing a remediation action if the detected password does not comply with the at least one password policy.

3. The method of claim 2, wherein the remediation action comprises at least one of: communicating with an enforcement engine to block access with the network, communicating with an identity provider to change the detected password, and alerting a network administrator.

4. The method of claim 1, wherein determining whether the detected password complies with the at least one password policy comprises:
   analyzing a feature of the detected password, wherein the at least one password policy includes one or more requirements for the feature.

5. The method of claim 1, wherein determining whether the detected password complies with at least one password policy comprises:
   comparing the detected password to previously observed matching password hashes to determine an age of the password or password re-use.

6. The method of claim 1, wherein the password policy is associated with a strength level of the detected password, and wherein determining whether the detected password complies with at least one password policy further comprises:
   generating the strength level based on a comparison of the password to previously observed matching passwords.

7. The method of claim 1, wherein the detected password is detected based on the payload of the packet, wherein the payload includes information that exceeds a password threshold.

8. The method of claim 7, wherein it is determined that the password threshold is exceeded when at least one or more of a sequential string of characters is identified, a common password is identified from a common password database, or specific information associated with a user is identified.

9. A system comprising:
a memory; and
a processor in communication with the memory, the processor being configured to perform operations comprising:
receiving a packet configured to travel in a network, wherein the packet is configured to travel from a first device to a second device;
analyzing the packet, wherein analyzing the packet includes identifying a header of the packet and a payload of the packet;
detecting a password within the packet based on analyzing the header of the packet wherein the detected password is detected based on the header including a network destination that is associated with a password database;
determining whether the detected password complies with at least one password policy; and
providing a password policy compliance output to a user, wherein the password policy compliance output indicates to the user whether the detected password complies with the at least one password policy.

10. The system of claim 9, wherein the processor is configured to perform operations further comprising:
implementing a remediation action if the detected password does not comply with the at least one password policy.

11. The system of claim 9, wherein determining whether the detected password complies with the at least one password policy comprises:
analyzing a feature of the detected password, wherein the at least one password policy includes one or more requirements for the feature.

12. The system of claim 9, wherein determining whether the detected password complies with at least one password policy comprises:
comparing the detected password to previously observed matching password hashes to determine an age of the password or password re-use.

13. A computer program product comprising a computer readable storage medium having program instructions embodied therewith, the program instructions executable by a processor to cause the processor to perform a method, the method comprising:
receiving, by a processor, a packet configured to travel in a network, wherein the packet is configured to travel from a first device to a second device;
analyzing the packet, wherein analyzing the packet includes identifying a header of the packet and a payload of the packet;
detecting a password within the packet based on analyzing the header of the packet wherein the detected password is detected based on the header including a network destination that is associated with a password database;
determining whether the detected password complies with at least one password policy; and
providing a password policy compliance output to a user, wherein the password policy compliance output indicates to the user whether the detected password complies with the at least one password policy.

14. The computer program product of claim 13, wherein the method further comprises:
implementing a remediation action if the detected password does not comply with the at least one password policy.

15. The computer program product of claim 14, wherein the remediation action comprises at least one of: communicating with an enforcement engine to block access with the network, communicating with an identity provider to change the detected password, and alerting a network administrator.

16. The computer program product of claim 13, wherein determining whether the detected password complies with the at least one password policy comprises:
analyzing a feature of the detected password, wherein the at least one password policy includes one or more requirements for the feature.

17. The computer program product of claim 13, wherein determining whether the detected password complies with at least one password policy comprises:
comparing the detected password to previously observed matching password hashes to determine an age of the password or password re-use.

* * * * *